United States Patent
Mintz

(10) Patent No.: US 6,266,527 B1
(45) Date of Patent: Jul. 24, 2001

(54) SYSTEM AND METHOD FOR MEASURING POWER AND BIT ERROR RATE ON THE UP-LINK AND DOWN-LINK SIMULTANEOUSLY

(75) Inventor: Yaron Mintz, Dallas, TX (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/067,928

(22) Filed: Apr. 28, 1998

(51) Int. Cl.[7] ............... H04M 11/00; H04B 7/26; H04J 3/14
(52) U.S. Cl. .......... 455/423; 455/67.1; 455/67.3; 455/226.2; 455/522; 379/21
(58) Field of Search ............... 455/423, 226.2, 455/67.1, 161.3, 67.3, 522, 446, 447, 448, 449, 67.4, 67.7; 379/21, 1; 370/252

(56) References Cited

U.S. PATENT DOCUMENTS

| | | | |
|---|---|---|---|
| 5,289,526 | * 2/1994 | Chymyck et al. | 455/424 |
| 5,386,588 | * 1/1995 | Yasuda | 455/423 |
| 5,398,276 | * 3/1995 | Lemke et al. | 379/21 |
| 5,490,204 | * 2/1996 | Gulledge | 455/423 |
| 5,521,904 | * 5/1996 | Eriksson et al. | 370/249 |
| 5,564,075 | * 10/1996 | Gourgue | 455/69 |
| 5,603,092 | * 2/1997 | Stjernholm | 455/63 |
| 5,845,212 | * 12/1998 | Tanaka | 455/437 |
| 5,898,928 | * 4/1999 | Karlsson et al. | 455/450 |
| 5,930,241 | * 7/1999 | Fried | 370/328 |
| 6,006,089 | * 12/1999 | Sasaki et al. | 455/423 |

FOREIGN PATENT DOCUMENTS 0 767 552 A2  10/1995  (EP).
WO 95/33352  12/1995  (WO).

OTHER PUBLICATIONS

PCT International Search Report dated Aug. 2, 1999.

* cited by examiner

Primary Examiner—Lee Nguyen
Assistant Examiner—Simon Nguyen
(74) Attorney, Agent, or Firm—Jenkens & Gilchrist, P.C.

(57) ABSTRACT

A telecommunications system and method is disclosed for measuring the bit error rate (BER) and power on up-link and down-link channels substantially simultaneously from a mobile terminal to enable real time analysis in the field. This can be accomplished by including an application within a memory in the mobile terminal, which can initiate Link Balance (LB) start and stop commands sent from the mobile terminal to the base station. The LB start command is sent from the MS to the base station, instructing the base station to measure the power and BER on the up-link and forward these measurements to the mobile terminal. Simultaneously, the mobile terminal can measure the power and BER on the down-link and determine the current location. The up-link measurements, down-link measurements, and location information can then be displayed to the technician in real time, either on the mobile terminal itself or on a laptop computer.

20 Claims, 3 Drawing Sheets

SYSTEM AND METHOD FOR MEASURING POWER AND BIT ERROR RATE ON THE UP-LINK AND DOWN-LINK SIMULTANEOUSLY

BACKGROUND OF THE PRESENT INVENTION

1. Field of the Invention

The present invention relates generally to telecommunications systems and methods for maintaining voice quality in a wireless network, and specifically to measuring the power and bit error rate on the up-link and down-link channels simultaneously.

2. Background and Objects of the Present Invention

Cellular telecommunications is one of the fastest growing and most demanding telecommunications applications ever. Today it represents a large and continuously increasing percentage of all new telephone subscriptions around the world. Cellular networks have evolved into two different networks. The European cellular network uses the Global System for Mobile Communication (GSM) digital mobile cellular radio system. In the United States, cellular networks have traditionally been primarily analog, but recent advances have been incorporating digital systems within the analog networks. One such North American cellular network is the D-AMPS network, which is described hereinbelow.

With reference now to FIG. 1 of the drawings, there is illustrated a D-AMPS Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a Mobile Station (MS) 20 may move freely without having to send update location information to the MSC/VLR area 12 that controls the LA 18.

Mobile Station (MS) 20 is the physical equipment, e.g., a car phone or other portable phone, used by mobile subscribers to communicate with the cellular network 10, each other, and users outside the subscribed network, both wireline and wireless. The MS 20 may also include a Subscriber Identity Module (SIM) card 13, or other memory, which provides storage of subscriber related information, such as a subscriber authentication key, temporary network data, and service related data (e.g. language preference).

Each Location Area 12 is divided into a number of cells 22. The MSC 14 is in communication with a Base Station (BS) 24, which is the physical equipment, illustrated for simplicity as a radio tower, that provides radio coverage to the geographical part of the cell 22 for which it is responsible.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If an MS 20 roams into a new MSC/VLR area 12, the VLR 16 connected to that MSC 14 will request data about that MS 20 from the home HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Currently, speech and data are transmitted from the BS 24 to the MS 20 on a down-link channel 30 and from the MS 20 to the BS 24 on an up-link channel 32. If the power transmitted by the BS 24 on the down-link 30 is too high, in some areas of the cell 22, e.g., near the corners of the cell 22, the customer will see a good signal on the MS 20 power meter, but the MS 20 will not be able to access the system, because the up-link 32 power of the MS 20 is not strong enough. In addition, even if the MS 20 can access the system, the speech quality on the up-link 32 is usually poor. Furthermore, in order to reduce co-channel interference, which is the interference caused by the use of the same frequency within two different clusters of cells 22, the power on the down-link 30 must be minimized.

The BS 24 has two receiver antennas, for diversity, and one transmitting antenna. In certain areas of the cell 22, the reception on the down-link 30 can be poor, e.g., the bit error rate (BER) is high, because the transmitting antenna is not suitably located for this area of the cell 22, but, at the same time, the reception on the up-link 32 can be good, e.g., the BER is low, because at least one of the receiving antennas is located satisfactorily with respect to the same area of the cell 22. Therefore, in order to maintain a system with balance links, e.g., up-link 32 and down-link 30, both in power and in the BER, the power and BER must be known at each point in the cell 22 for both the up-link 32 and the down-link 30, simultaneously.

In order to sufficiently analyze the power and BER for the up-link 32 and down-link 30, a technician must drive the area covered by the cell 22 and compare both in real time and in off-line, the difference between the up-link 32 and the down-link 30 for both the signal strength and the BER. Currently, there are three options for performing these measurements. First, the technician can drive the area and measure only the down-link 30. However, in this case, the down-link 30 and the up-link 32 can not be compared at every point in the cell 22. Secondly, the technician can compare the logs from the MSC 14, which show the reading for both the up-link 32 and the down-link 30 at the same time. However, in this case, the exact location of the MS 20 within the cell 22 is not available. Finally, as discussed in Suutarinen, WO 97-342024, both the up-link 32 and down-link 30 can be measured simultaneously with knowledge of the location, but the setup has to be done in the MSC 14 and two technicians are required: one in the MSC 14 measuring and receiving the power and BER, and one driving the cell 22 with an MS 20. Thus, the above solutions do not give a real time solution in the field for the drive technician.

It is, therefore, an object of the invention to perform real time measurements in the field of both power and BER for both the up-link and down-link substantially simultaneously.

It is a further object of the invention to allow the power and BER measurements to be performed in the field by one technician.

It is still a further object of the invention to have all of the information, e.g., up-link and down-link power and BER measurements, as well as the geographical location of the mobile terminal, within the mobile terminal itself in order to analyze the system and make decisions more easily, faster and more efficiently.

SUMMARY OF THE INVENTION

The present invention is directed to telecommunications systems and methods for measuring the bit error rate (BER) and power on the up-link and down-link channels substantially simultaneously from the mobile terminal itself. The location coordinates are already stored within the mobile terminal, and therefore, real time analysis can be performed in the field. This can be accomplished by including an application within a memory in the mobile terminal, which can initiate Link Balance (LB) start and stop commands, which are then sent from the mobile terminal to the base station. Alternatively, the mobile terminal can be connected to a laptop computer, which has an application within a memory responsible for instructing the mobile terminal to send the LB start and stop commands. Once the LB start command is received by the base station, the base station measures and calculates the power and BER on the up-link and forwards these measurements to the mobile terminal. The base station continues to calculate the power and BER and transmits these measurements until the base station receives an LB stop command. Simultaneously, the mobile terminal can measure the power and BER on the down-link along with determining the position of the mobile terminal. The up-link measurements, down-link measurements, and location information can then be displayed to the technician in real time, either on the mobile terminal itself or on the laptop computer to enable the technician to determine problem areas, e.g., areas where the signal strength and/or BER are not substantially equivalent on the up-link and down-link.

BRIEF DESCRIPTION OF THE DRAWINGS

The disclosed inventions will be described with reference to the accompanying drawings, which show sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
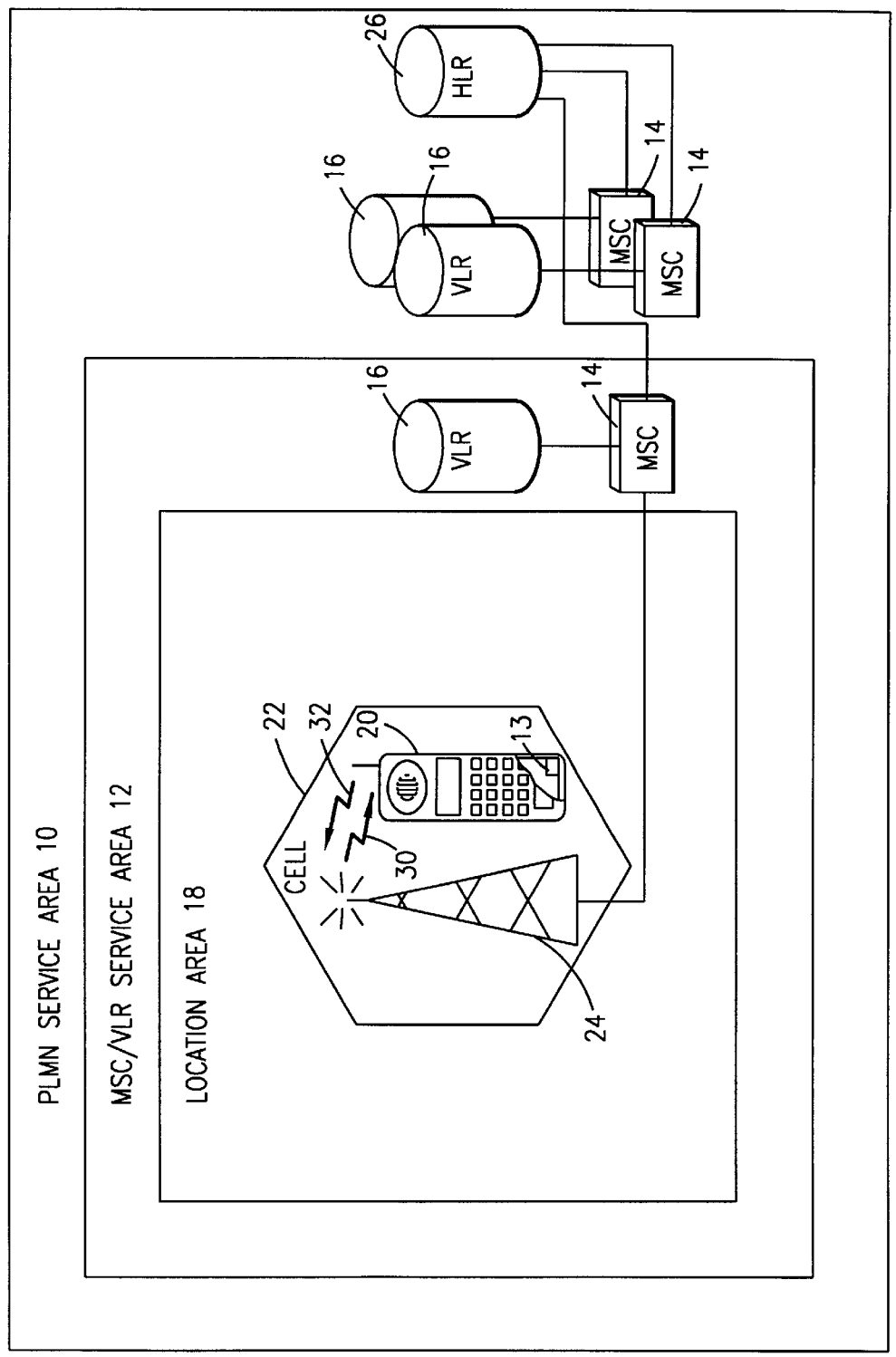
FIG. 1 is a block diagram of a conventional terrestrially-based wireless telecommunications system.
Figure 2:
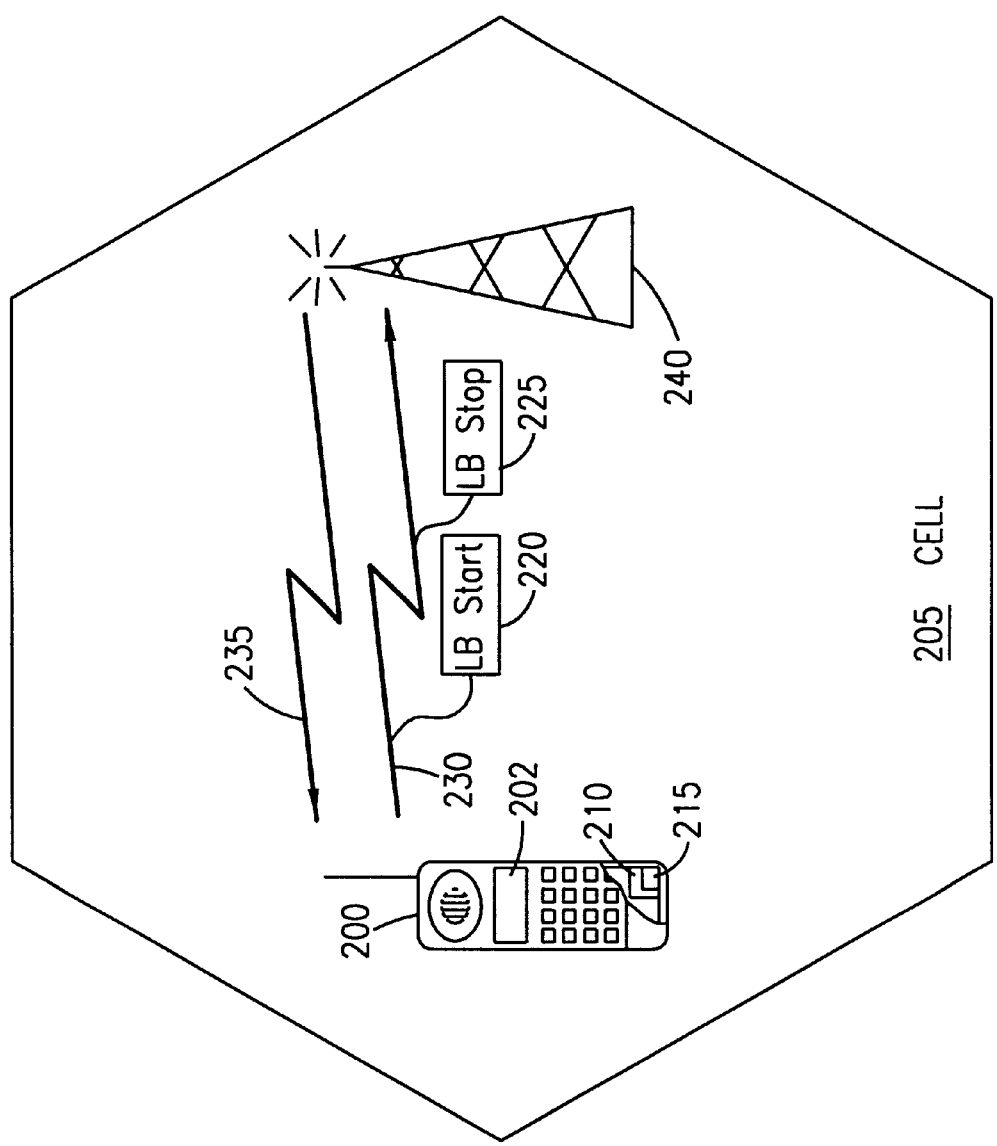
FIG. 2 illustrates the measurement of power and bit error rate on both the up-link and down-link simultaneously on a mobile terminal, in accordance with preferred embodiments of the present invention.

With reference now to FIG. 2 of the drawings, a link balance application 215 can be included within a memory 210, e.g., a Subscriber Identity Module (SIM) card 210, in a Mobile Station (MS) 200, which can send Link Balance (LB) start 220 and stop 225 commands from the MS 200 to a Base Station (BS) 240, e.g., a Base Transceiver Station (BTS), serving a cell 205 that the MS 200 is currently located in. When a technician desires to know the power and bit error rate (BER) on both an up-link channel 230 and a down-link 235 channel substantially simultaneously in order to ensure that the links are balanced, the technician can activate the aforementioned link balance application 215, which can then send the LB start command 220 to the serving BS 240. Upon receiving the LB start command 220, the BS 240 begins measuring and calculating the power and the BER on the up-link channel 230 (the channel from the MS to the BS) and forwards these measurements to the MS 200 on the down-link channel 235. The measurements can be transmitted on, for example, a Slow Associated Control Channel (SACCH) or within a DATA part of a Time Division Multiple Access (TDMA) timeslot, as is understood in the art. The BS 240 continues to calculate the power and BER on the up-link channel 230 and transmits these measurements to the MS 200 until the BS 240 receives an LB stop command 225 from the MS 200.

Simultaneously, the MS 200 can measure the power and BER on the down-link channel 235 and determine the current position of the MS 200. The location information can be obtained using various positioning methods, such as Global Positioning Service (GPS). The up-link measurements, down-link measurements, and location information can then be displayed to the technician in real time on a display 202 on the MS 200 itself, enabling the technician to determine problem areas, e.g., areas where the power and BER measurements are not substantially equivalent on the up-link channel 230 and the down-link channel 235.

If the technician should notice an area within the cell 205 with a power or BER variance on the up-link 230 and down-link 235 channels, the technician can then continue to drive or traverse that area in the cell 205 to obtain as much information about that area as possible. Thereafter, this information can be downloaded into a computer (not shown) for further analysis to correct the problem. In this way, the technician does not need to re-drive the area to obtain further information after diagnosis of a problem, because the problem is made known to the technician during the initial drive.

Figure 3:
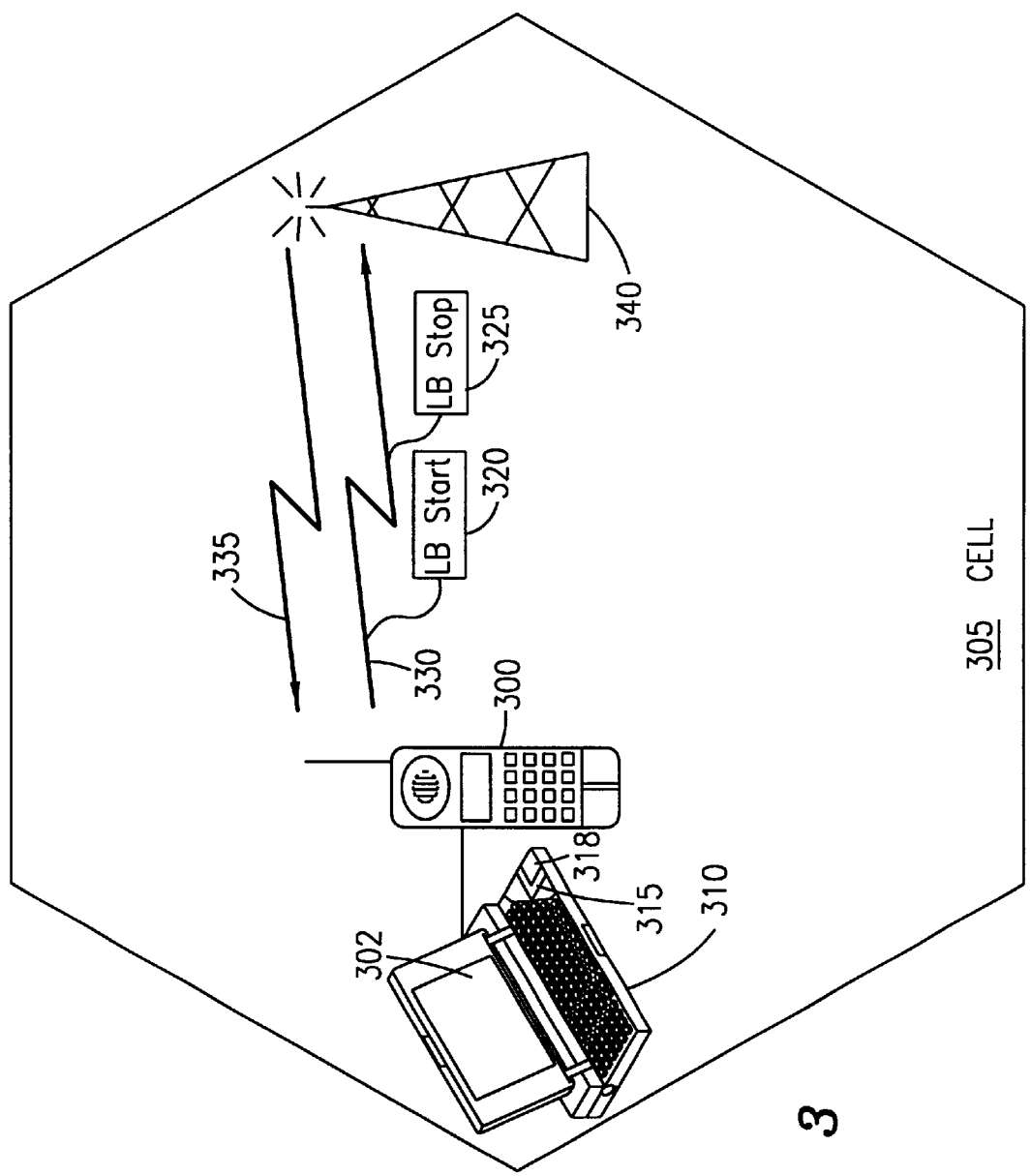
FIG. 3 illustrates the measurement of power and bit error rate on both the up-link and down-link simultaneously on a laptop computer, in accordance with preferred embodiments of the present invention.

Alternatively, as indicated in FIG. 3 of the drawings, the MS 300 can be connected to a laptop computer 310, which has a link balance application 318 within a memory 315, which is responsible for instructing the MS 300 to send the LB start 320 and stop 325 commands. As discussed hereinbefore, once the LB start command 320 is sent to the BS 340, the BS 340 measures and calculates the power and BER on the up-link 330 and forwards these measurements to the computer 310, via the MS 300. The BS 340 continues to calculate the power and BER and transmit these measurements until the BS 340 receives an LB stop command 325. Simultaneously, the computer 310, via the MS 300, measures the power and BER on the down-link 325, along with determining the position of the MS 300 within the cell 305. The up-link measurements, down-link measurements, and location information can then be displayed to the technician in real time on a display 302 on the laptop computer 310 to enable the technician to determine problem areas while still in the field.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for measuring the power and bit error rate on an up-link channel and a down-link channel simultaneously, said telecommunications system comprising:

a base station adapted to measure the power and bit error rate associated with said up-link channel in response to receiving a link balance start command;

a mobile terminal in wireless communication with said base station, said mobile terminal being adapted to send said link balance start command, receive the measured power and bit error rate associated with said up-link channel from said base station in response to sending said link balance start command and measure the power and bit error rate associated with said down-link channel substantially simultaneously to receiving the measured power and bit error rate associated with said up-link channel; and a memory within said mobile terminal for storing the power and bit error rate associated with said up-link channel and said down-link channel;

wherein said base station sends the power and bit error rate associated with said up-link channel to said mobile terminal repeatedly until said mobile terminal sends a link balance stop command to said base station.

2. The telecommunications system of claim 1, wherein said mobile terminal stores, within said memory, location information associated with the location of said mobile terminal within the area served by said base station.

3. The telecommunications system of claim 2, wherein the power and bit error rate associated with said up-link channel and said down-link channel and said location information are displayed on a display on said mobile terminal.

4. The telecommunications system of claim 2, wherein said memory is a Subscriber Identity Module.

5. The telecommunications system of claim 1, wherein said base station is a Base Transceiver Station.

6. A telecommunications system for measuring the power and bit error rate on an up-link channel and a down-link channel simultaneously, said telecommunications system comprising:

a base station adapted to measure the power and bit error rate associated with said up-link channel in response to receiving a link balance start command;

a mobile terminal in wireless communication with said base station, said mobile terminal being adapted to send said link balance start command, receive the measured power and bit error rate associated with said up-link channel from said base station in response to sending said link balance start command and measure the power and bit error rate associated with said down-link channel substantially simultaneously to receiving the measured power and bit error rate associated with said up-link channel; and a computer connected to said mobile terminal, said computer instructing said mobile terminal to send said link balance start command, said computer receiving the power and bit error rate associated with said up-link channel and said down-link channel via said mobile terminal;

wherein said base station sends the power and bit error rate associated with said up-link channel to said computer via said mobile terminal repeatedly until said computer instructs said mobile terminal to send a link balance stop command to said base station.

7. The telecommunications system of claim 6, wherein said computer is a laptop computer.

8. The telecommunications system of claim 6, wherein said computer has a memory therein for storing the power and bit error rate associated with said up-link channel and said down-link channel.

9. The telecommunications system of claim 8, wherein said computer stores, within said memory, location information associated with the location of said mobile terminal within the area served by said base station.

10. The telecommunications system of claim 9, wherein the power and bit error rate associated with said up-link channel and said down-link channel and said location information are displayed on a display on said computer.

11. A method for measuring the power and bit error rate on an up-link channel and a down-link channel simultaneously, said method comprising the steps of:

sending, by a mobile terminal in wireless communication with a base station, a link balance start command to said base station;

measuring, by said base station, the power and bit error rate associated with said up-link channel;

sending, by said base station, the measured power and bit error rate associated with said up-link channel to said mobile terminal;

substantially simultaneous to said mobile terminal receiving the measured power and bit error rate associated with said up-link channel, measuring, by said mobile terminal, the power and bit error rate associated with said down-link channel;

storing, by said mobile terminal, the power and bit error rate associated with said up-link channel and said down-link channel within a memory within said mobile terminal;

sending, by said mobile terminal, a link balance stop command to said base station; and discontinuing, by said base station, the sending of the power and bit error rate associated with said up-link channel to said mobile terminal.

12. The method of claim 11, wherein said mobile terminal stores, within said memory, location information associated with the location of said mobile terminal within the area served by said base station.

13. The method of claim 12, further comprising, after said step of storing, the step of:

displaying, on a display on said mobile terminal, the power and bit error rate associated with said up-link channel and said down-link channel and said location information.

14. The method of claim 12, wherein said memory is a Subscriber Identity Module.

15. The method of claim 11, wherein said base station is a Base Transceiver Station.

16. A method for measuring the power and bit error rate on an up-link channel and a down-link channel simultaneously, said method comprising the steps of:

instructing, by a computer connected to a mobile terminal, said mobile terminal to send said link balance start command to a base station in wireless communication with said mobile terminal;

measuring, by said base station, the power and bit error rate associated with said up-link channel;

sending the power and bit error rate associated with said up-link channel from said base station to said computer via said mobile terminal;

substantially simultaneous to said mobile terminal receiving the measured power and bit error rate associated with said up-link channel, measuring, by said mobile terminal, the power and bit error rate associated with said down-link channel;

sending, by said computer, via said mobile terminal, a link balance stop command to said base station; and discontinuing, by said base station, the sending of the power and bit error rate associated with said up-link channel to said computer via said mobile terminal.

17. The method of claim 16, wherein said computer is a laptop computer.

18. The method of claim 16, further comprising, after said step of measuring, the step of:

storing, within a memory within said computer, the power and bit error rate associated with said up-link channel and said down-link channel.

19. The method of claim 18, wherein said computer stores, within said memory, location information associated with the location of said mobile terminal within the area served by said base station.

20. The method of claim 19, further comprising, after said step of storing, the step of:

displaying, on a display on said computer, the power and bit error rate associated with said up-link channel and said down-link channel and said location information.

* * * * *